United States Patent [19]

Hickson

[11] Patent Number: 4,507,396

[45] Date of Patent: Mar. 26, 1985

[54] SOLID BODY PREPARATION AND FORMATION BY AGGLOMERATION IN AN IMMISCIBLE SOLVENT

[75] Inventor: Donald A. Hickson, Benicia, Calif.

[73] Assignee: Chevron Research Company, San Francisco, Calif.

[21] Appl. No.: 524,197

[22] Filed: Aug. 18, 1983

[51] Int. Cl.$^3$ .................. B01J 29/06; B01J 37/00
[52] U.S. Cl. ........................... 502/8; 502/60; 502/64; 502/68
[58] Field of Search ............ 502/8, 10, 439, 68, 502/64, 60

[56] References Cited

U.S. PATENT DOCUMENTS

| | | | |
|---|---|---|---|
| 2,474,911 | 7/1949 | Pierce et al. | 502/8 |
| 3,296,151 | 1/1967 | Heinze et al. | 502/8 |
| 3,515,684 | 6/1970 | McEvoy | 502/8 |
| 3,656,901 | 4/1972 | Kummerle | 252/448 X |
| 3,844,978 | 10/1974 | Hickson | 252/455 R |
| 4,013,587 | 3/1977 | Fischer et al. | 502/8 |

FOREIGN PATENT DOCUMENTS 127250  3/1948  Australia .................. 502/8

OTHER PUBLICATIONS

*Particle Size Enlargement*, C. E. Capes (Elsevier Scientific Publishing Company, Amsterdam, 1980), Chapter 8, "Agglomeration in a Liquid Media".

*Journal of Catalysis*, 18, No. 3, 358–360, (1980), S. J. Tauster.

*The Canadian Journal of Chemical Engineering*, Sirianni et al., Feb. 1964, pp. 42–43.

*Chemical Engineering*, Jon E. Browning, "Agglomeration: Growing Larger in Applications and Technology", Dec. 1967, pp. 147–170.

*The Strength of Granules and Agglomerates*, H. Rumpf, pp. 379–414, in Intl. Sym. on Agglomeration, 1st Philadelphia, Am. Inst. Mining, Metal, and Petrol Engr. Ed. W. A. Kneeper, J. Wiley Interscience (1962).

*Primary Examiner*—Carl F. Dees
*Attorney, Agent, or Firm*—Burns, Doane, Swecker & Mathis

[57] ABSTRACT

A process for forming plastic inorganic agglomerates from which inorganic catalysts or adsorbent bodies can be formed is disclosed. The process involves (a) dispersing a portion of said inorganic material as surface hydrated noncolloidal sized dry particles in a water-immiscible solvent;

(b) titrating the dispersion with a controlled quantity of an aqueous phase in the presence of colloidal sized particles of the same or different inorganic material while mixing until a hydrous plastic agglomerate forms; and (c) separating said hydrous plastic agglomerate from said water-immiscible solvent.

16 Claims, No Drawings

SOLID BODY PREPARATION AND FORMATION BY AGGLOMERATION IN AN IMMISCIBLE SOLVENT

FIELD OF THE INVENTION

This invention is in the field of solid body preparation. More particularly, it concerns a process for forming solid bodies useful in the chemical process and related industries as catalysts, adsorbents and catalyst supports via agglomeration of a suspension of solid particles.

Prior Art

A wide variety of solid inorganic bodies are prepared for use in the chemical process and related industries. These bodies find application as catalysts, as supports for catalytic materials, as adsorbents and the like.

A range of processes are known to form such bodies. In some, an aqueous medium is employed. For example, U.S. Pat. No. 3,844,978 of Hickson discloses a process wherein hydrothermal crystallization of an aqueous slurry of hydrous gels and salts is carried out, the slurry is dewatered, and dried to give solids which are ground to a desired size. U.S. Pat. No. 3,296,151 of Heinze et al, describes a process in which solid zeolite particles are moistened with water, mixed with a binder and kneaded into a paste which is extruded or otherwise shaped and then dried. Several processes which employ nonaqueous media have been described in the literature. The just-noted Heinze et al patent discloses a process in which an aqueous sol is dripped into a water-immiscible liquid where the sol gels. The Heinze et al patent shows a third process in which suspended solids are mixed into an aqueous sol and this aqueous mixture is dripped into a water-immiscible liquid and thereby gelled. U.S. Pat. No. 3,515,684 discloses that one can form a solid catalyst by comulling water and clay and then dispersing this formed aqueous based material as a "flour" in an organic liquid and turbulently mixing it to agglomerate the particles. U.S. Pat. No. 3,656,901 of Kummerle mentions that it is known to gel silica and silica/alumina particles by dropping aqueous colloidal sodium silicate or colloidal silica alumina into a water-insoluble medium. The text *Particle Size Enlargement* by C. E. Capes (Elsevier Scientific Publishing Company, Amsterdam, 1980) has a chapter (8) entitled "Agglomeration in Liquid Media" which reviews a variety of applications of water-immiscible media in particle-forming processes. Tauster discloses a related process in the *Journal of Catalysis*, 18, No. 3, 358-360 (1980). The Tauster process is a method for impregnating the pores of particles with metal salt by suspending them in a water-immiscible liquid like hydrocarbon and titrating the liquid with an aqueous solution of metal salt. These prior processes are not without their shortcomings. For one, it is often difficult to vary the composition of the solid body. Also, the products of these processes are often fine powders or chips whose mechanical properties (shape, strength, attrition resistance, etc.) may be unacceptable for use under conditions of intended service or in further processing steps. Sometimes these properties can be improved by further admixing the particles with a binder and forming catalyst bodies. This mixing occurs on a macro scale which does not always prove advantageous.

The present invention provides a new method of broad applicability for forming solid inorganic bodies such as catalysts, catalyst supports, adsorbents, and the like.

Further, this invention provides an alternative method for forming an intimate dispersion of two or more hydrous or hydrated components at the colloidal or subcolloidal level in such a manner that the resultant dispersion of solids can be readily formed into agglomerates or useful shapes with desirable mechanical as well as catalytic or absorbent properties.

STATEMENT OF THE INVENTION

It has now been found that plastic agglomerates which comprise solid inorganic materials (preferably of an oxidic nature) and from which solid inorganic catalysts or adsorbant bodies of increased strength can be formed are themselves formed by the process of (a) dispersing with mixing a portion of said inorganic material as surface-hydrated noncolloidal sized dry particles in a water-immiscible solvent thereby forming a thoroughly separated dispersion;

(b) titrating the dispersion with a controlled quantity of an aqueous phase in the presence of colloidal sized particles of the same or different inorganic material while continuing the mixing until a hydrous plastic agglomerate forms comprising the aqueous phase, the noncolloidal particles and the colloidal particles; and (c) separating the hydrous plastic agglomerate from the water-immiscible solvent.

In one embodiment, colloidal particles are added separately prior to adding the aqueous phase and the aqueous phase is made up essentially of water and solely serves to agglomerate the dispersed particles. In a variation of the first embodiment, the aqueous phase contains a dissolved salt or compound which reacts with a member of the agglomerate or becomes incorporated into the agglomerate. In a third embodiment, the aqueous phase is itself a sol of colloidal particles which are incorporated into the agglomerate.

In other aspects this invention concerns the process for making formed catalyst or absorbent particles wherein the plastic agglomerate so produced is formed or shaped and then dried.

DETAILED DESCRIPTION OF THE INVENTION

In accord with this invention, a water-immiscible liquid is used as the medium for forming inorganic agglomerates. A "water-immiscible liquid" is a material which is liquid at the conditions of use and which dissolves in water to an extent that the resulting solution contains less than 0.1% by weight of the liquid. While one can imagine certain inorganic liquids such as silicone fluids and halocarbon liquids which meet the definition and which are included in the definition of "water-immiscible liquids", the far more common and thus preferred "water-immiscible liquids" are organic liquids, especially liquids comprising hydrocarbons and/or halohydrocarbons. Representative suitable water-immiscible liquids include $C_5$ to $C_{14}$ branched, cyclic, and straight chain - saturated and unsaturated aliphatic hydrocarbons; $C_6$ to $C_{12}$ alkaryl hydrocarbons; and halohydrocarbons containing up to about 4 halos, especially chloro's, and from 1 to about 8 carbons. It is also very suitable to employ mixtures of these materials or distillation fractions composed primarily of these materials.

Thus, representative water-immiscible liquids include suitable Freons, carbon tetrachloride, chloroform, methylene chloride, trichloroethylene, dichloropropane, and like halohydrocarbons, n-pentane, n-hexane, cyclohexane, 2-methylpentane, hex-1-ene, benzene, n-heptane, methylcyclohexane, branched heptanes and heptenes, toluene, the normal and branched octanes and octenes, the xylenes, ethylbenzene, n-nonane and the branched nonanes, the various decanes, the dodecanes and like hydrocarbons; $C_6$–$C_7$, $C_6$–$C_8$ and $C_7$–$C_8$ naphtha fractions, mixed xylene-ethylbenzene fractions and the like. Preferred water-immiscible liquids are the $C_6$ to $C_8$ hydrocarbons including aliphatics like n-hexane, cyclohexane, n-heptane and n-octane and fractions composed in substantial part by these aliphatics and the aromatics such as benzene, toluene, ethylbenzene, xylenes and fractions composed in substantial part by these aromatics.

When practicing the present invention, noncolloidal particles are suspended in the water-immiscible liquid and agglomerated by titration with an aqueous phase in the presence of colloidal or even subcolloidal sized particles. This provides three avenues for materials to be incorporated into the final solid product. For one, the material or a precursor of the material can be already present in the suspended noncolloidal solid particles. For another, the material or a precursor can be present as colloidal particles or alternatively in the agglomerating aqueous phase as sol particles or dissolved in the aqueous phase. Of course, once the solid products has been formed, one can use art-known methods such as impregnation, vapor deposition or the like to deposit additional materials in or on the solid bodies.

The particles which are initially suspended in the water-immiscible liquid include materials of noncolloidal size. That is, they are from about 100 microns to about 0.1 microns in average size (diameter), preferably, they are from about 100 microns to about 0.15 microns in size, most preferably from about 75 microns to about 0.2 microns in size and may even consist of aggregated interlocked small colloidal size particles in the range 5–1000 nM. The colloidal sized particles, whether added as a powder or as a sol have particles sized in the 5–200 nanometer range, preferably 5 to 100 nanometers. Generally there should be at least about a 2:1 ratio in particle sizes between the two classes of particles, preferably the ratios is from 1000:1 to 2:1. The relative sizes of the colloidal particles and the noncolloidal particles are considered important as they mutually reinforce one another, much as aggregate and sand reinforce one another in concrete, and give a tougher-stronger finished body.

The relative amounts of noncolloidal (micron sized) and colloidal particles are controlled. The exact ratio of the amounts of the two types of particles will depend in part on the product being produced. Generally, there should be at least 5% by weight of each type—i.e. a 95:5 to 5:95 weight ratio. When the process is employed to produce a catalytic material such as a hydrocarbon reforming or hydroforming catalyst, based on micron-sized particles of catalytic material, the weight ratio of micron-sized to colloidal-sized particles is generally 90:10 to 50:50, preferably 85:15 to 55:45. When the process is employed to produce stronger materials, such as absorbents and hydrocracking catalysts, the ratio of micron-sized to colloidal-sized particles is generally 50:50 to 10:90, preferably from 45:55 to 15:85. The large sized particles generally include one or more inorganic oxides or inorganic oxide precursor compounds. The particles can include naturally occuring materials such as micron-sized fractions of the various clays. They can also include particularly synthesized materials such as the crystalline zeolites, and like aluminosilicates. Of course, the exact materials employed will depend in large measure on the projected use for the finished solid materials and the art-known compositions employed in that use. Thus, if the finished materials are to serve as adsorbents-simple alumina, silica, and/or titania particles or precursors may be employed. Similarly, if the finished material is to serve as an essentially inert support for a catalyst, alumina, silica, boria, titania or binary compounds of the like particles or precursors may be employed. If the solid products are themselves to have special catalytic activities or the like, for example as petroleum cracking, reforming or isomerization catalysts, appropriately active components should be incorporated via the particles or via the aqueous phase. Representative micron-sized particulate materials which can be incorporated into solid bodies using the present suspension process include nonoxidic materials like silicon carbide, silicides and $TiN_2$; silica, alumina, magnesia, thoria, titania, boria, zirconia, beryllia, and like metal oxides; or precursors of oxides such as metal phosphates, sulfates, molybdates, aluminophosphates, vanadates and the like which on calcination or the like yield such oxidic materials; as well as preformed binary or ternary mixtures such as silica-alumina, silica-magnesia, silica-alumina-magnesia, titania-alumina, titania-silica and the like; diatomaceous earth, micron-sized fractions of synthetic or naturally-occurring clay minerals including the smectites, kandites, micas, vermiculites and attapulgites, for example halloysite, kaolinite, dickite, nacrite, talc, montmorillonite, beidellite, saponite, hectorite and the kaolins; zeolitic tektosilicate minerals including the small port, medium port and large port zeolites, by way of example, Linde type A small port molecular sieve medium port type A synthetic zeolite and the large port type X, Y or L zeolites. Other useful zeolites include the natural zeolites such as erionite, chabazite, active analcites, gmelinite and mordenite as well as the multitude of synthetic or modified crystalline zeolites such as crystalline zeolites referred to in the trade as ZSM-11 described in U.S. Pat. 3,709,979 and ZSM-5 and ZSM-8 described in U.S. Pat. No. 3,755,145; zeolites A, X, Y, L, D, R, S, T described in U.S. Pat. No. 3,013,990 and patents cited therein, CZH-5 zeolite as described in U.S. Pat. No. 4,360,419, ZSM-43 as described in U.S. Pat. No. 4,209,499, ZSM-34 as described in U.S. Pat. No. 4,086,186 and ZSM-39 as described in U.S. Pat. No. 4,287,166. Micronized particles of preformed catalysts or catalyst precursors can be employed. The aforesaid materials are intended to be descriptive. Other equivalent materials can be employed as well.

The colloidal particles are generally colloidal particles of inorganic oxidic materials such as fumed silica, fumed titania, fumed alumina, or the like as well as colloidal fractions of the clay minerals, especially the smectites and kandites. Ground silicas or ground binary oxides can also be in the colloidal range as can be the binary or higher combinations of oxidic materials produced by the microgel process of B. Mulaskey (U.S. Pat. No. 3,243,368) or the aerogel process (U.S. Pat. Nos. 2,039,454, 2,188,007).

The aqueous medium titrated into the water-immiscible liquid can be water itself, water containing a dissolved material which will serve as an active agent, promoter or activator when incorporated into the ultimate solid body product or which will react with one or more of the solid body components, or it can be an aqueous-solvated inorganic colloidal sol.

When the aqueous phase contains a dissolved material, this material can be an activity-promoting or catalytic metal compound such as a salt or complex. It can also be an acid which will react with and peptise the solid oxide particles to increase the strength of their agglomeration.

The amount of aqueous phase added to the water-immiscible-liquid based suspension of solid particles should be controlled so that only enough is added to agglomerate the solid particles. Excesses are not required and, in fact can be detrimental. With this in mind, if one is incorporating a material via the aqueous phase one should adjust the concentration in the aqueous phase so that the correct amount of material is present when agglomeration takes place.

In a typical agglomeration, the relative amounts of water-immiscible liquid, solid particles and aqueous liquid and colloidal particles are generally within the following ranges:

Water-immiscible liquid: 500 parts by weight,
Solid particles (noncolloidal plus colloidal): 40 to 10 parts by weight, and
Aqueous phase: 10 to 40 parts by weight.

During the agglomeration, the mixture of water-immiscible liquid, solid particles and aqueous phase is strongly agitated under high shear conditions to assure that the solid particles remain in suspension until they are agglomerated in the aqueous phase. The addition of aqueous phase should be carried out slowly, preferably adding from about 1 to 2% of the total aqueous phase per minute up to about 25% of the total per minute. Slower additions may be made as well, if desired. Other conditions can be selected at will—generally ambient temperature being used, although high or low temperatures may be used as well, if desired.

The product of the agglomeration is a plastic mass of agglomerated micron-sized and colloidal-sized particles and water and optionally catalytically active promoters, reactants or reagents and the like. Such materials generally contain from about 30 to 65% and more typically 40 to 55% volatiles, which are primarily composed of water, usually with a few percent of accidentally-entrained water-immiscible liquid phase.

To form usable solid bodies, this plastic mass is further processed, such as by shaping via extruding, die punching, molding, etc.

It is also within the purview of this invention to treat the plastic mass it provides prior to shaping so as to adjust the volatiles content (usually downward with vacuum and/or heat); to ion exchange the mass; or to promote desired crystallization in the mass and the like as can be accomplished by aging hydrothermal crystallization at 25° to 800° C. for 5-24 hours, and the like.

The shaped particles formed from the plastic mass are dried and/or calcined using conditions of the art. These can include the use of air or an inert nonoxidizing gas atmosphere, heating to dry at 120° F. to 325° F., and calcining at 750° F. to 1100° F. in an oxygen containing atmosphere. One can, when appropriate, as in the case of catalysts including molybdenum, tungsten, cobalt and/or nickel, thermally treat the catalysts in an oxygen-containing gas stream at 850° F. to 1600° F. Depending upon the particular activity or properties desired, it may be desirable to apply additional post-production activation steps such as reduction, sulfidation, halidation or other treatments to add, modify or redistribute the species present in the catalyst. In a variation of the present process, the dried material can be ground or otherwise divided, mixed with a binder and repelleted, if desired.

The products of this invention find wide industrial utility as catalysts, catalyst supports and as adsorbants in the chemical and petroleum processing industries.

This invention will be further described by the following examples which are provided to illustrate the invention and are not to be construed as limiting the invention's scope.

EXAMPLE I

Potassium L-type zeolite powder, crystallite size 0.5-1 $\mu M$, was dispersed in n-heptane using a Waring Blendor. A fumed silica (Cab-O-Sil), particle size 20 $\mu M$, was added and dispersed uniformly with the zeolite. An aqueous dispersion of "Ludox" colloidal silica sol (30.1 Wt % = $SiO_2$) and water was added slowly to the dispersion until an agglomerated mass was formed. The quantitites of solids, solvents, and water were selected to provide an hydrous mass of 47% volatiles (as water). The predetermined solid fraction consisted of 65 wt % zeolite, 35% $SiO_2$ (half as Cab-o-Sil (Degussa, AG, Germany), half as Ludox(Dupont, USA)). The agglomerated mass was separated by filtration and subjected to vacuum degassing for 30 minutes at room temperature to remove heptane before extruding through a 1/16-in. die to form cylindrical particles. The extrudate was then vacuum dried for 16 hr at 110° C. to set the material before calcination for 10 hr at 1000° F. in dry air. Hard, strong 1/16-in. catalyst particles were obtained which could readily withstand additional ion-exchange with potassium solutions and impregnation processing steps to provide a finished catalyst.

By judicious selection of zeolite powder, fumed oxides, and hydrous oxide sols, strong 1/16-in. extrudates of micron-sized L-zeolite with colloidal sized $Al_2O_3$*, $SiO_2$*, $TiO_2$*, $ZrO_2$*, Attagel 50+, and selected combinations such as $TiO_2$–$Al_2O_3$, $TiO_2$–$SiO_2$, $SiO_2$–$Al_2O_3$, etc., were made. These materials ranged in zeolite content from 10 to 90%.

*Degussa AG, Germany
+ Engelhard Minerals and Chemicals Co., USA

EXAMPLE II

The procedure of Example I was repeated varying the solid particulate feeds. As micron-sized particles (65%), the same potassium L-type zeolite was used. Alon-C dry $Al_2O_3$ powder (20–30 nM size) 21%, was used as one colloidal particle and sufficient $Al_2O_3$ hydrous sol (Nyacol Products Inc. PQ Corp., USA) was used to give a total of 35% $Al_2O_3$ in the final product. Again, a strong catalyst resulted.

EXAMPLES III, IV and V

The procedure of Example I was repeated thrice using 65% micron sized potassium L-type zeolite and (in Example III) 35% colloidal-sized fumed titania powder, (in Example IV) 35% colloidal-sized zirconia powder and (in Example V) 35% colloidal-sized fumed silica, "Ludox", and water as agglomerating liquid. If desired, this procedure could be repeated with a salt solution, such as for example KCl solution, as agglomerating liquid so as to add potassium or the like to the final product.

EXAMPLES VI and VII

The procedure of Example III was repeated using half the amount of titania and either a corresponding amount of Al$_2$O$_3$ as a hydrous colloidal alumina sol or SiO$_2$ as a hydrous colloidal sol to give strong zeolite 65% - TiO$_2$/Al$_2$O$_3$ 35% and zeolite 65% -TiO$_2$/SiO$_2$ 35% finished products.

EXAMPLE VIII

The procedure of Example III was repeated using colloidal Attapulgas clay in place of titania sol to give a strong finished product that was 65% zeolite - 35% clay.

EXAMPLE IX

The procedure of Example III was repeated using as micron-sized particles, 20 micron Cab-O-Sil silica and as colloidal particles Ludox colloidal silica sol. This gave a strong solid pure silica product.

EXAMPLE X

The procedure of Example III was repeated using as micron-sized particles, 10 micron alumina particles as colloidal particles colloidal alumina. This gave a strong solid pure alumina product.

What is claimed is:

1. The process for producing a plastic agglomerate comprising inorganic materials suitable for further processing to form strong solid catalytic or absorptive refractory bodies which comprises the steps of:
   (a) dispersing with mixing a portion of said inorganic materials as surface hydrated micron-sized particles in a water-immiscible solvent thereby forming a thoroughly separated dispersion;
   (b) gradually and controllably adding to said dispersion an aqueous phase in the presence of colloidal sized inorganic particles while continuing said mixing until a hydrous plastic agglomerate forms comprising said aqueous phase and said micron-sized and colloidal particles; and
   (c) separating said hydrous agglomerate from said water-immiscible solvent.

2. The process of claim 1 wherein the weight amount of micron-sized particles is greater than the weight amount of colloidal sized particles.

3. The process of claim 1 wherein the weight ratio of micron-sized particles to colloidal sized particles is from 51:49 to 90:10.

4. The process of claim 3 wherein the colloidal particles are added to the water immiscible solvent in the form of an aqueous colloidal sol.

5. The process of claim 3 wherein the colloidal particles are all added to the water immiscible solvent as dry particles.

6. The process of claim 3 wherein the colloidal particles are added to the water immiscible solvent as dry particles and as an aqueous colloidal sol.

7. The process of claim 3 wherein the micron-sized particles are zeolite and the colloidal particles are alumina.

8. The process of claim 7 wherein the weight ratio of zeolite to alumina is about 65:35.

9. The process of claim 3 wherein the micron-sized particles are zeolite and the colloidal particles are titania.

10. The process of claim 9 wherein the weight ratio of zeolite to titania is about 65:35.

11. The process of claim 3 wherein the micron-sized particles are zeolite and the colloidal particles are silica.

12. The process of claim 11 wherein the weight ratio of zeolite to silica is about 65:35.

13. The process of claim 3 wherein the micron-sized particles are zeolite and the colloidal particles are clay.

14. The process of claim 13 wherein the weight ratio of zeolite to clay is about 65:35.

15. The process of claim 3 wherein the micron-sized particles are zeolite and the colloidal particles are zirconia.

16. The process for producing strong solid shaped bodies from catalytic or absorptive inorganic oxidic materials which comprises the steps of:
    (a) dispersing said oxidic materials as surface-hydrated dry powder with mixing in a water-immiscible solvent thereby forming a thoroughly separated dispersion;
    (b) gradually and controllably adding to said dispersion an aqueous phase while continuing said mixing until a plastic mass comprising said powder and said aqueous phase agglomerates as a hydrous agglomerate;
    (c) separating said hydrous agglomerate from said water-immiscible solvent;
    (d) forming said agglomerate into shaped bodies; and
    (e) drying and calcining the shaped body to give a solid shaped body.

* * * * *